INVENTORS
R. W. BROWN
G. A. MITCHELL
BY C. A. Hamilton
ATTORNEY

Aug. 12, 1958  R. W. BROWN ET AL  2,847,570
APPARATUS FOR MEASURING PULSE CHARACTERISTICS
Filed May 13, 1955  2 Sheets-Sheet 2

INVENTORS
R. W. BROWN
G. A. MITCHELL
BY C. A. Hamilton
ATTORNEY

United States Patent Office 2,847,570
Patented Aug. 12, 1958

2,847,570

APPARATUS FOR MEASURING PULSE CHARACTERISTICS

Raymond W. Brown, Evergreen Park, Ill., and Gerald A. Mitchell, White Bear Lake, Minn., assignors to Western Electric Company, Incorporated, New York, N. Y., a corporation of New York Application May 13, 1955, Serial No. 508,038

9 Claims. (Cl. 250—36)

This invention relates to methods of and apparatus for measuring pulse characteristics, and more particularly to methods of and apparatus for detecting missing pulses of a train of pulses.

In the testing of electronic pulse forming devices such as, for example, magnetrons, it is essential to detect, with a high degree of accuracy, pulses which are imperfect, and also, it is essential to detect the percentage of pulses missing per unit of time from the train of pulses produced by the magnetron. In the past, there has been no simple, reliable apparatus for effecting these results.

An object of the invention is to provide new and improved methods of and apparatus for measuring pulse characteristics.

Another object of the invention is to provide new and improved methods of and apparatus for detecting missing pulses of trains of pulses produced by magnetrons.

A further object of the invention is to provide simple, stable and reliable methods of and apparatus for detecting missing pulses of magnetrons.

In a method and apparatus illustrating certain features of the invention, a magnetron may be pulsed by pulses of a predetermined frequency from a trigger generator or the like, and the pulses from the trigger generator are sent through a mixing tube while the pulses which are coincidental with the pulses from the trigger generator are sent through a pair of diodes having their cathodes so biased relative to one another that only portions of the magnetron pulses above a predetermined percentage of the average voltage of the magnetron pulses are transmitted through one of the cathodes. The portions of the pulses coming from the diode including the last-mentioned cathode are amplified and are widened into blocking pulses which are impressed on a suppressor grid of a mixing tube having a control grid receiving pulses from the trigger generator. Thus, only pulses from the trigger generator coincident with completely blocked pulses from the magnetron pulse the mixing tube, and a meter receives the output of the mixing tube for indicating the percentage of pulses shorter than said predetermined value.

Figure 1:
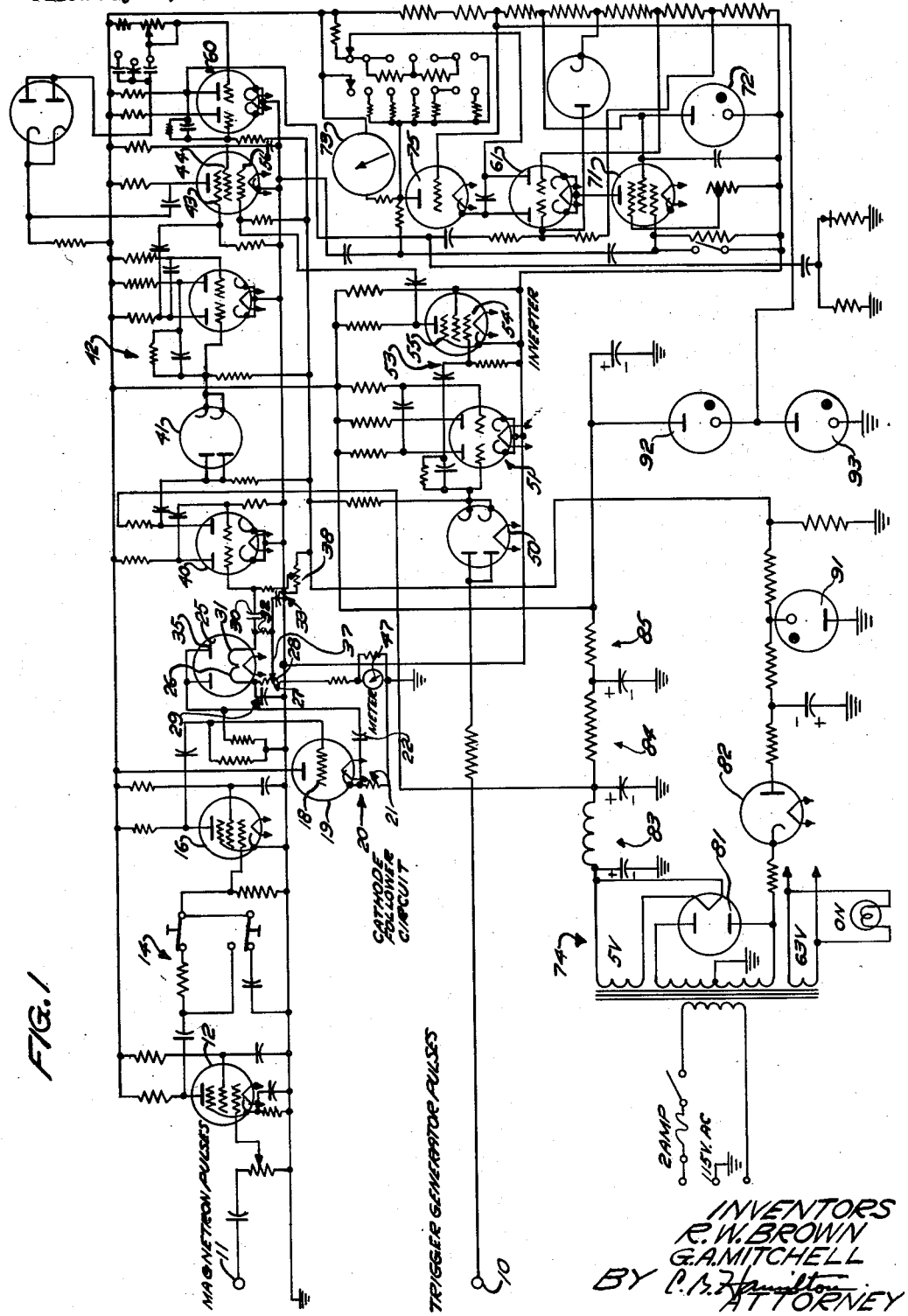
Figure 2:
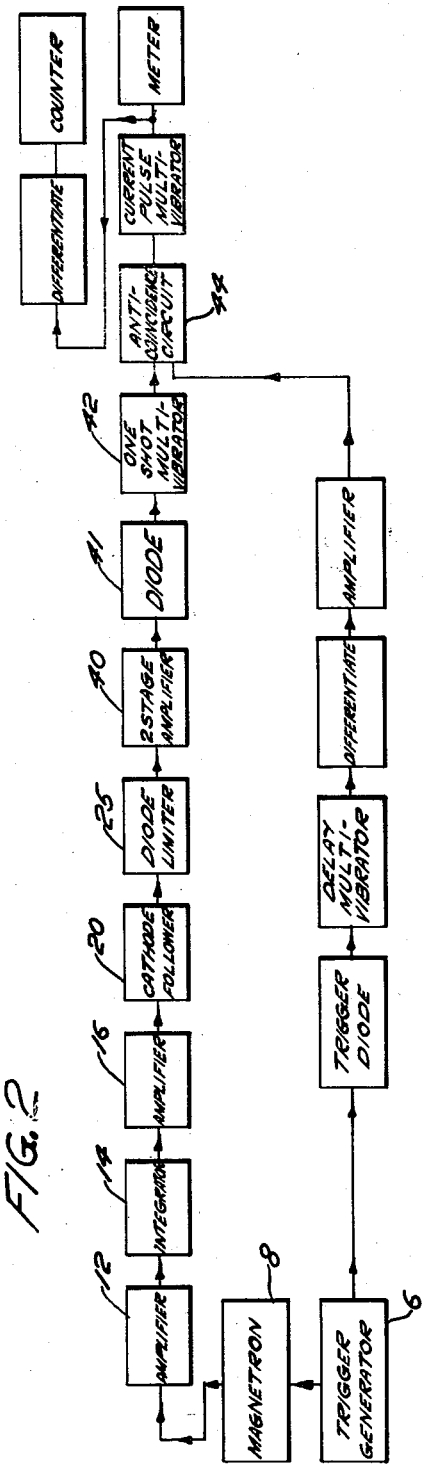
Figure 3:
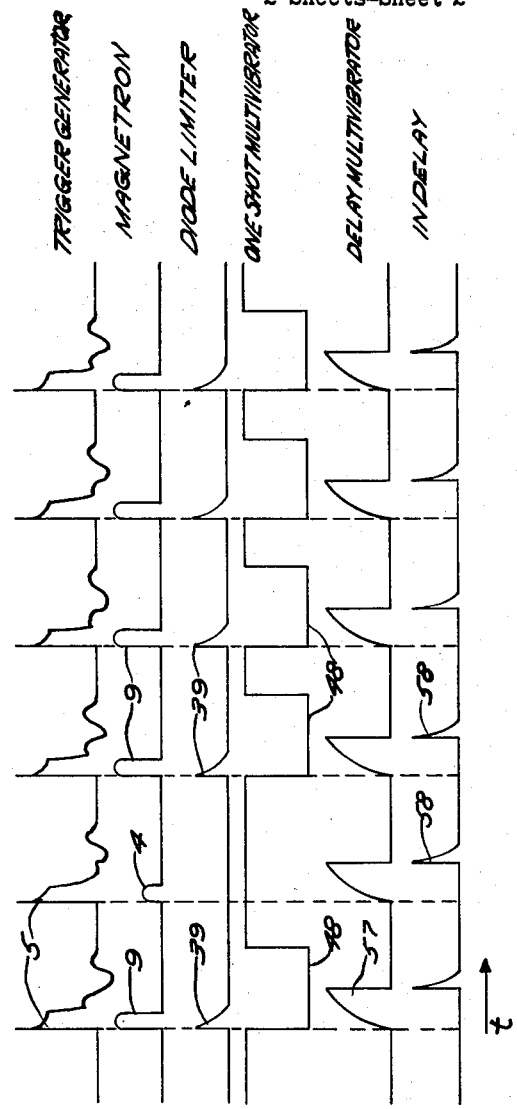

A complete understanding of the invention may be obtained from the following detailed description of a method and apparatus forming a specific embodiment thereof when read in conjunction with the appended drawings, in which, Fig. 1 is a diagrammatic view of an apparatus for practicing a method forming one embodiment of the invention, Fig. 2 is a block diagram of the apparatus shown in Fig. 1, and Fig. 3 is a graphical illustration of the method.

Referring now in detail to the drawings, there is shown therein a circuit for detecting missing pulses 4 (Fig. 3) from a magnetron 8, which are shorter or narrower than normal pulses 9 from the magnetron. A trigger generator 6 generating spaced pulses 5 simultaneously actuates the magnetron and also sends a pulse 5 to a jack 10. The output of the magnetron sends the positive pulses 4 and 9 to a jack 11 leading to an amplifier 12, energy of pulses from which are measured by an integrating network 14 which produces pulses whose amplitude is proportional to the energy or area of the input pulses and output pulses are fed through an amplifier tube 16. The output of the tube 16 is fed to a grid 18 of a tube 19 forming a portion of a cathode follower circuit 20 including a resistance 21 and a condenser 22.

The voltage across the cathode follower circuit 20 is applied to a dual rectifier 25, which has a cathode 26 connected in series with a network 27 having a high time constant and including a potentiometer 28 and a condenser 29. The cathode follower circuit 20 is provided to match the output impedance of the tube 16 to that of the condenser 29. A condenser 30 connects a second cathode 31 of the rectifier tube 25 to a grid of an amplifying tube 40. A resistor 32 in parallel with the condenser 30 connects the cathode 31 to a slider 37 of the potentiometer 28, and is connected to a grounded condenser 33. The resistor 32 is used to provide a load for the cathode 31 and to isolate the slider 37 from the cathode 31. The slider 37 is connected to the potentiometer 28 at a point such that the cathode 31 is so biased relative to the cathode 26 that no pulse of a voltage less than 70% of the average voltage of the pulses applied to the plates 35 of the tube 25 passes through the cathode 31. That is, the cathode 31 is biased relative to the cathode 26 to such an extent that only the tip portions of the pulses above 70% of the value of the normal pulses to the tube 25 pass through the cathode 31 to the tube 40, the voltage on the cathode 31 being only about 70% of the voltage on the cathode 26.

In order for the cathode 31 and its plate 35 to be conductive, the pulses to the tube 25 must be greater than 70% of the value of the average signal. Hence, any magnetron pulses which are less than 70% of the average voltage of the magnetron pulses are completely eliminated. Then, tips 39 remaining above the 70%, for pulses which are not short, are applied to the two-stage amplifier 40 and are amplified highly. The amplified pulses are fed to a rectifier 41 which cuts off any tails and also prevents any feed back to the previously described circuit. By adjusting the slider 37 on the potentiometer 28, the 70% cut-off point can be varied as desired. A grid bias potentiometer is provided for the amplifier tube 40. A signal level meter 47 is provided to indicate the pulse voltage range of the circuit.

The amplified tips 39 are fed from the rectifier 41 to a one-shot multivibrator circuit 42, which generates square negative going pulses 48 of a duration of about twenty micro-seconds whenever it is actuated by one of the pulses from the tube 41. Thus, if any pulse less than 70% of the average pulse voltage has been fed to the diode limiter circuit 25, the multivibrator circuit 42 is not actuated, while it is actuated by any pulse which is of a voltage 70% or greater than that of the average pulse. The signal from the multivibrator 42 is applied to a suppressor grid 43 of a mixing tube 44.

Each pulse 5 applied to the jack 10 by the trigger generator 6 is sent through a rectifier tube 50 to a one-shot multivibrator circuit 51 which forms a pulse 57, which is differentiated to form a pulse delayed relative to the trigger pulse 5 about 12 micro-seconds to place the resulting pulse in about the middle of the pulse 48 formed by the multivibrator circuit 42. Then, the pulse output of the one-shot multivibrator 51 is sent through a network 53 to a control grid 54 of an inverting tube 55 to form pulses 58.

Each pulse 58 from the tube 55 is opposite in polarity to the negative pulse generated by the multivibrator circuit 42, and is applied to a control grid 56 of the mixing tube 44 simultaneously with the signal or pulse 48 from the multivibrator circuit 42, which normally occurs except when the initiating signal pulse 4 is less than 70% of the voltage of the average pulse. Thus, normally the pulse from the inverter 55 originating with the trigger generator 6 is completely blocked and no signal is applied to a one-shot multivibrator 60. However, whenever the voltage of one of the pulses from the magnetron 8 is less than 70% of the average voltage of these pulses so that no signal is applied by the multivibrator 42 to the mixing tube 44, the signal originating with the trigger generator 10 and eventuating from the inverting tube 55 is not blocked in the mixing tube 44 and is fed to the one-shot multivibrator circuit 60, which forms a pulse of a width equal to one-half the period of time between two triggering pulses. The pulse from the circuit 60 is fed to a tube 61 to make it conductive. Thus, the tube 60 is conductive for lengths of time proportional to the percent of short pulses 4 occurring.

A constant voltage tube 72 causes a tube 71 to have a constant grid voltage thereon, and the tube 71 causes a quantity of current proportional to the number of short pulses to go to a meter 73 calibrated in percent of short pulses. Excessive currents are limited by a tube 75. A conventional power supply 74 provides a constant B+ voltage, and includes a full-wave rectifier tube 81, a half-wave rectifier bias voltage tube 82 and filtering networks 83, 84 and 85. Voltage regulator tubes 91, 92 and 93 are provided to stabilize the voltages in the circuits in which these tubes are connected.

If desired the integrating network 14 may be omitted, and the pulses of the magnetron having an amplitude level below a predetermined average amplitude level is measured by the remaining portion of the circuit.

The above-described method and apparatus precisely measure the percentage of magnetron pulses which are less than a predetermined voltage determined by the setting of the potentiometer 28. Thus, the reliability of the magnetron 8 may be determined.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for detecting missing pulses, which comprises means for creating a train of pulses of a predetermined frequency to trigger a magnetron, a first means for blocking each magnetron pulse below a predetermined energy level, means for sending the pulses of said train toward a meter, and a second means operable by said first blocking means for blocking each pulse of said train coincident with a magnetron pulse above said predetermined energy.

2. An apparatus for detecting missing pulses, which comprises a first diode having a plate and a cathode, a second diode having a plate and a cathode, means for sending a train of pulses of a predetermined frequency to the plates of the diodes, means responsive to the energy level of the train of pulses for biasing the first cathode, and potential dividing means connecting the second cathode to the first cathode, whereby only portions of the pulses above a predetermined voltage level flow through the second diode.

3. An apparatus for detecting missing pulses, which comprises a first diode having a plate and a cathode, a second diode having a plate and a cathode, means for sending a train of pulses of a predetermined frequency to the plates of the diodes, means responsive to the energy level of the train of pulses for biasing the first cathode, potential dividing means connecting the second cathode to the first cathode, whereby only portions of the pulses above a predetermined voltage level flow through the second diode, means for creating blocking pulses from the pulses flowing through the second diode, a mixing tube having a control grid receiving a train of pulses of said frequency and a suppressor grid receiving unblocked portions of the pulses, and a meter responsive to average current flow through the mixing tube.

4. An apparatus for detecting missing pulses, which comprises a first diode having a plate and a cathode, a second diode having a plate and a cathode, a trigger generator for sending a train of pulses of a predetermined frequency to a magnetron to cause the magnetron to emit pulses simultaneously therewith, cathode follower means for sending amplified magnetron pulses to the plates of the diodes, means responsive to the energy level of the amplified magnetron pulses for biasing the first cathode, potential dividing means connecting the second cathode to the first cathode, whereby only portions of the amplified magnetron pulses above a predetermined voltage level flow through the second diode, means for creating blocking pulses from the pulses flowing through the second diode, a mixing tube having a control grid receiving pulses from the trigger generator and a suppressor grid receiving unblocked portions of the amplified magnetron pulses, and a meter responsive to average current flow through the mixing tube.

5. An apparatus for detecting missing pulses, which comprises a first pulse path along which a train of pulses of varying magnitude and a predetermined frequency is started, a second pulse path paralleling the first pulse path along which a second train of pulses of said frequency is started, each pulse of the second train of pulses occurring simultaneously with one of the pulses of the first train of pulses, means in the first path for blocking each pulse of the first train of pulses of less than a predetermined amplitude, a mixing device at the end of said paths for cancelling each pulse of the second train coincident with an unblocked pulse of the first train, and means responsive to the mixing device for measuring the frequency of the pulses of the second train not blocked by pulses of the first train.

6. An apparatus for detecting missing pulses, which comprises a first pulse path along which a train of pulses of varying magnitude and a predetermined frequency is started, a second pulse path paralleling the first pulse path along which a second train of pulses of said frequency is started, each pulse of the second train of pulses occurring simultaneously with one of the pulses of the first train of pulses, means for delaying each pulse of the second train, means in the first path for blocking each pulse of less than a predetermined amplitude of the first train of pulses, a mixing tube at the end of said paths, a suppressor grid included in said mixing tube, means operated by each unblocked pulse of the first train for applying a square wave blocking signal to the suppressor grid of the mixing tube to cancel each pulse of the second train coincident with an unblocked pulse of the first train, and means responsive to the mixing device for measuring the frequency of the pulses of the second train not blocked by pulses of the first train.

7. In an apparatus for detecting missing pulses from a train of pulses, means for generating said train of pulses, a pair of diodes each having a cathode and anode, means for applying said pulses to said anodes, means coupling the first cathode to the second for biasing said second cathode to permit the second diode to conduct only when a pulse of predetermined magnitude is impressed on its anode, and means under the cojoint control of the pulses produced by the second diode and said original train of pulses for measuring the presence of pulses produced by said second diode.

8. An apparatus for detecting pulses missing from a train of constant frequency pulses, means for producing said train of pulses, a coincident blocking device, a first circuit for applying said train of pulses to said coincident blocking device, means included in said first circuit for blocking pulses below a predetermined energy level, a second circuit for applying said pulses to said coincident blocking device, and means within said second circuit for changing the polarity of the pulses to a character opposite to the polarity of the pulses applied by said first circuit to said coincident blocking device.

9. In a detector circuit for determining the continuity of a train of pulses, means for generating a train of voltage pulses, a discriminating circuit for only passing pulses of a predetermined voltage magnitude, a coincidence tube driven toward states of non-conductivity by said passed voltage pulses, means for generating a second train of voltage pulses, means for applying said second pulses to operate said coincidence tube whenever one of said first pulses is not applied thereto, and means responsive to operation of said coincidence tube for indicating the absence of a first pulse.

References Cited in the file of this patent

UNITED STATES PATENTS

| | | |
|---|---|---|
| 2,256,529 | Seeley | Sept. 23, 1941 |
| 2,426,989 | Rosa | Sept. 9, 1947 |
| 2,489,297 | Labin et al. | Nov. 29, 1949 |
| 2,562,912 | Hawley | Aug. 7, 1951 |
| 2,789,267 | Beal et al. | Apr. 16, 1957 |
| 2,790,142 | Guthrie | Apr. 23, 1957 |